Jan. 29, 1946.  G. W. BALDWIN  2,393,877
TRACTOR ATTACHMENT FOR LOADING AND TRANSPORTING MATERIALS
Filed Jan. 19, 1944  2 Sheets-Sheet 1
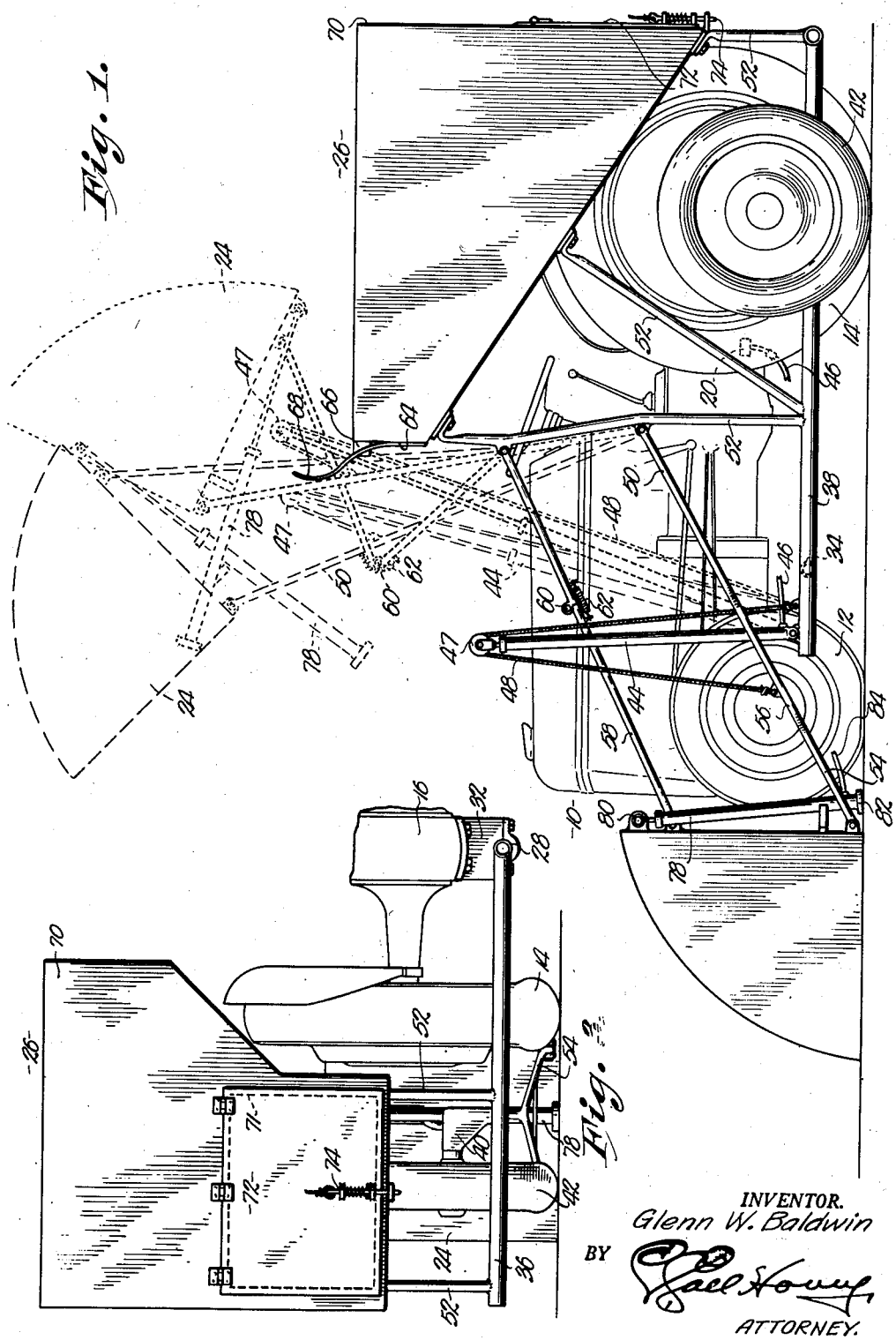
INVENTOR.
Glenn W. Baldwin
BY
ATTORNEY.

Jan. 29, 1946.  G. W. BALDWIN  2,393,877
TRACTOR ATTACHMENT FOR LOADING AND TRANSPORTING MATERIALS
Filed Jan. 19, 1944   2 Sheets-Sheet 2
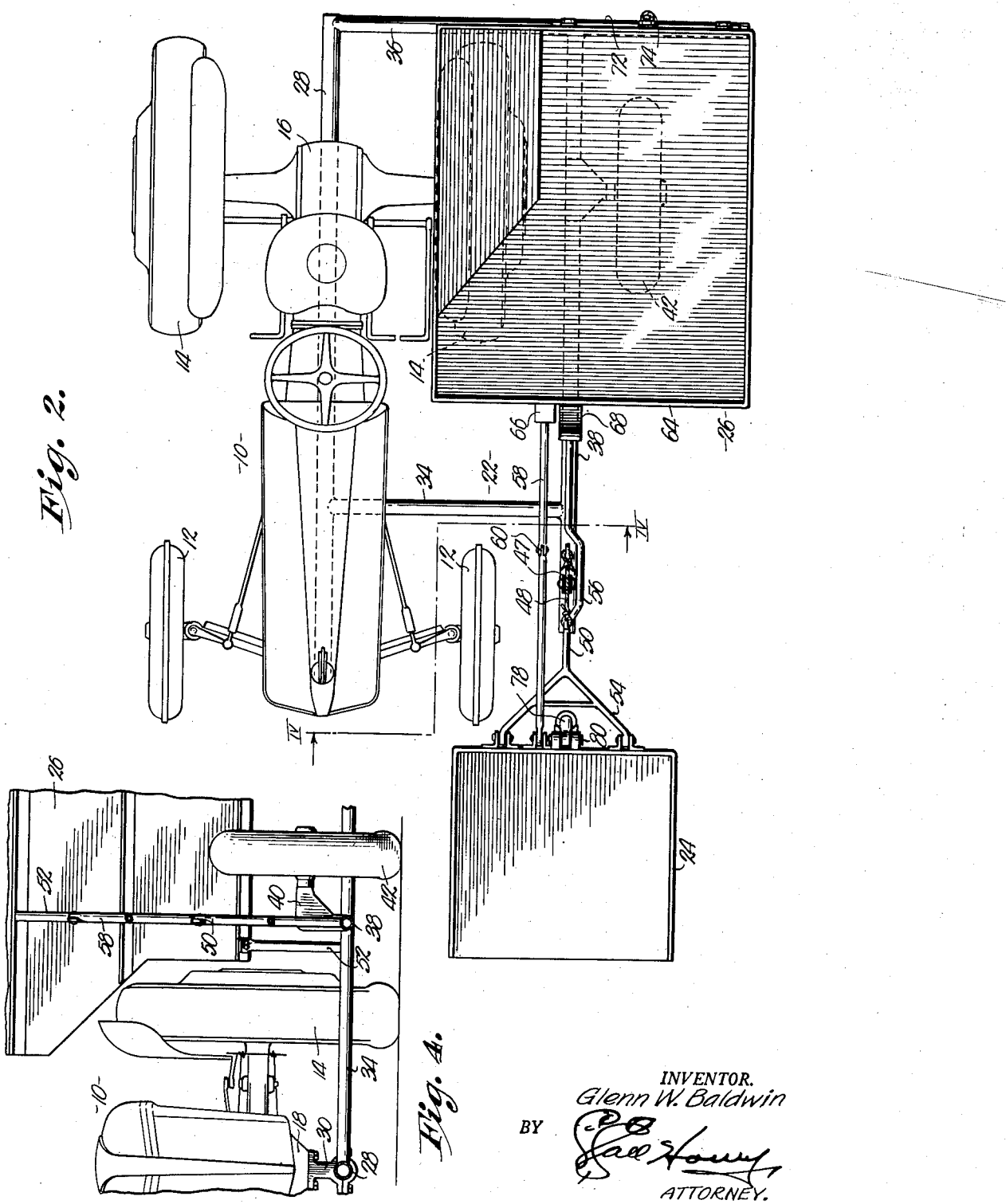
INVENTOR.
Glenn W. Baldwin
BY
ATTORNEY.

Patented Jan. 29, 1946

2,393,877

UNITED STATES PATENT OFFICE 2,393,877

TRACTOR ATTACHMENT FOR LOADING AND TRANSPORTING MATERIALS

Glenn W. Baldwin, South Gate, Calif., assignor, by direct and mesne assignments, to C. Earl Hovey, trustee, Kansas City, Mo.

Application January 19, 1944, Serial No. 518,800

5 Claims. (Cl. 214—78)

This invention relates to material loading and transporting apparatus and more particularly to equipment of that character adapted to be attached to, and operated by, a conventional tractor.

In many present day industries, a need has arisen for a mobile unit capable of quickly loading and transporting material over relatively short distances with a minimum amount of manual labor. The primary object of this invention is, therefore, the provision of an attachment for a tractor of the type equipped with a hydraulic pump, which attachment embodies a scoop and a hopper carried by the tractor, the scoop being operated by the hydraulic mechanism of the tractor to dump its load into the hopper.

It is a further object of the invention to provide lifting mechanism for the scoop, which will effect automatic dumping of the scoop when reaching a predetermined position above the hopper.

A yet further aim of the invention is the provision of initial lifting means for the scoop to lighten the load imposed upon the lifting arm and main hydraulic ram.

Other objects of the invention will become apparent during the course of the following specification, referring to the accompanying drawings, wherein:

Fig. 1 is a side elevational view of a tractor equipped with loading and transporting mechanism constructed in accordance with this invention.

Fig. 2 is a plan view of the assembly illustrated in Fig. 1.

Fig. 3 is a rear elevational view of the apparatus showing the manner of mounting an auxiliary frame beneath the rear axle housing of the tractor; and Fig. 4 is a fragmentary cross sectional view taken on line IV—IV of Fig. 2, showing the bearing pivotally connecting the auxiliary frame with the front end of the tractor.

In the drawings is shown a conventional tractor generally designated by the numeral 10 and having front wheels 12, rear wheels 14, a differential and rear axle housing 16, and a front housing section 18. A hydraulic pump 20, indicated by dotted lines, may comprise either an integral part of the tractor or an auxiliary unit conveniently located thereon and driven by a moving part of the tractor.

An auxiliary frame 22, for mounting a scoop 24 and a hopper 26, includes a tubular member 28 which is journalled in front and rear bearings 30 and 32 respectively secured to the front housing section 18 and the differential housing 16. Lateral arms 34 and 36 join member 28 with a parallel frame member 38 which in turn is provided with a bracket 40 whereon is mounted a wheel 42 in a vertical plane with the rear wheels 14 of the tractor. The auxiliary frame or side carriage is, therefore, free to pivot about the horizontal axis of frame member 28 to compensate for irregularities in the ground surface over which the rear wheels 14 of the tractor and wheel 42 of the frame respectively travel.

Pivotally mounted on frame member 38 adjacent its forward end is a hydraulic ram 44 connected by a flexible conduit 46 with pump 20. A sheave 47 rotatably carried by the upper end of the ram, engages a cable 48 having one end anchored to frame member 28 and its opposite end secured to an arm 50 for lifting scoop 24. Arm 50 is pivotally joined at one end to a supporting structure comprising a part of frame 22 and including a plurality of standards or braces 52 mounting the hopper 26 on the side carriage 22. The other end of arm 50 preferably comprises a forked portion 54 pivotally connected to scoop 24 adjacent its lower edge. A laterally offset portion 56 of arm 50 provides clearance for travel of the latter along ram 44.

Further interconnecting the scoop 24 and support 52 is a jointed arm 58 spaced above arm 50 in substantially parallel relation therewith. A rule-type hinge joint 60 of arm 58 is located approximately midway between the ends of the arm, a spring 62 normally holding said arm in rectilinear condition.

Provided on the front wall 64 of hopper 26 is a bumper 66 and a resilient finger 68 for purposes presently to be disclosed. The rear wall 70 of the hopper has a discharge opening 71 which is normally closed by a swinging gate 72 hinged at its upper edge to wall 70 and having its lower edge provided with a spring-pressed bolt 74, or other suitable latch, adapted to be released from the driver's seat of the tractor when it is desired to unload the hopper.

When extremely heavy material is to be handled it may be found desirable to employ a supplementary ram 78 for initially raising scoop 24. Ram 78 is pivotally connected as at 80 to scoop 24 adjacent its upper end, and the lower end of the ram should be relatively large to form a foot 82 for engaging the ground surface. A flexible conduit 84 leads to pump 20 or is interconnected with conduit 46. As will be clear from Figs. 1 and 2 of the drawings, the lower end of ram 78 is prevented by the forked portion 54 of arm 50 between which it rides, from swinging freely about its pivotal connection 80 to a point where it would interfere with other parts of the attachment when the scoop reaches the upper limit of its travel.

The action of arms 50 and 58 for automatically dumping the contents of the scoop into the hopper is clearly shown by the dash and dotted lines of Fig. 1. After the tractor has moved forward to fill scoop 24, a suitable control valve (not shown), for pump 20 is manipulated to cause hydraulic fluid to enter the cylinders of rams 78 and 44 for raising the scoop. Upon striking bumper 66 arm 58 will "break" against the tension of spring 62 and continued upward movement of sheave 47 will tip the scoop to cause its contents to be discharged into hopper 26. Simultaneously therewith, arm 50 engages finger 68 and as soon as hydraulic pressure on the ram is relieved by further manipulation of the control valve, this finger exerts the necessary force against arm 50 for starting the scoop on its return or downward travel. Spring 62 again returns arm 58 to a rectilinear condition and the weight of the scoop will serve to return the plunger in ram 78 to its starting position when said ram is restrained against further downward movement by engagement of the foot 82 thereof with the surface of the ground.

From the foregoing, it will be seen that a simple yet practical tractor attachment has been provided for loading and transporting material, and while it is conceivable that various modifications might be made in details of structure without departing from the spirit of this invention, it is desired to be limited only by the scope of the appended claims.

Having thus described the invention, what is claimed as new and desired to be secured by Letters Patent is:

1. In an attachment of the character described for a tractor having a hydraulic pump, an auxiliary frame on the tractor; a hopper mounted on the frame; a scoop; a pair of substantially parallel arms pivotally interconnecting the scoop and frame; a hydraulic ram in communication with said pump, said ram having a sheave; a cable having its opposite ends respectively anchored to said arm and frame, one of said arms having a hinge intermediate its ends to effect tipping of the scoop when the latter reaches its upper limit of travel for discharging the contents of the scoop into said hopper; and resilient means engageable with the other of said arms upon the upper limit of travel of the latter to supply the initial force for starting the scoop on its downward movement.

2. In an attachment of the character described for a tractor having a hydraulic pump, an auxiliary frame on the tractor; a hopper mounted on the frame; a scoop; a pair of substantially parallel vertically spaced arms pivotally interconnecting the scoop and frame; a hydraulic ram in communication with said pump, said ram having a sheave; a cable having its opposite ends respectively anchored to the lower of said arms and to the frame, the upper of said arms having a hinge joint intermediate its ends and a spring for retaining said arm in rectilinear condition; and a bumper on the hopper engageable by the upper arm for breaking said joint to effect tipping of the scoop for discharge of its contents into the hopper.

3. In an attachment of the character described for a tractor having a hydraulic pump, a side carriage pivotally connected to the tractor, said carriage including a supporting wheel; a hopper mounted on the carriage; a scoop; an arm pivotally interconnecting said scoop and carriage; a hydraulic ram in communication with said pump, said ram being pivotally connected at its lower end to said carriage and having a sheave on its upper end; and a cable having its opposite ends respectively anchored to said arm and the frame said side carriage, the hopper and said scoop being entirely to one side of the tractor with the supporting wheel disposed beneath the hopper.

4. In an attachment of the character described for a tractor having a hydraulic pump, a side carriage pivotally connected to the tractor, said carriage including a supporting wheel; a hopper mounted on the carriage; a scoop; an arm pivotally interconnecting said scoop and carriage; a hydraulic ram in communication with said pump, said ram being pivotally connected at its lower end to said carriage and having a sheave on its upper end; a cable running over said sheave and having its opposite ends respectively anchored to said arm and frame; and an auxiliary ram in communication with the pump and having its upper end pivotally connected to the scoop for supplementing the initial lifting force of the first-named ram.

5. In an attachment of the character described for a tractor having a hydraulic pump, an auxiliary frame on the tractor; a hopper mounted on the frame; a scoop; a lower arm having one end pivotally connected to the frame and having an opposite end comprising a fork pivotally connected to the scoop adjacent its lower edge; an upper arm pivotally interconnecting the frame and the upper end of the scoop; a hydraulic ram having its lower end connected to the frame and having a sheave on its upper end; a cable running over said sheave having its opposite ends respectively anchored to the frame and to the lower arm; and an auxiliary ram in communication with the pump having its upper end pivotally connected to the scoop for supplementing the initial lifting force of the first-named ram, said auxiliary ram having its lower end positioned between the fork of the lower arm to limit pivoting movement of said ram relative to the scoop.

GLENN W. BALDWIN.